(12) United States Patent
Murayama (10) Patent No.: US 12,517,059 B2
(45) Date of Patent: Jan. 6, 2026

(54) OPTICAL DEVICE

(71) Applicant: Yokogawa Electric Corporation, Musashino (JP)

(72) Inventor: Kodai Murayama, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 188 days.

(21) Appl. No.: 18/373,436

(22) Filed: Sep. 27, 2023

(65) Prior Publication Data

US 2024/0102936 A1 Mar. 28, 2024

(30) Foreign Application Priority Data

Sep. 28, 2022 (JP) ................. 2022-155583

(51) Int. Cl.
*G01N 21/85* (2006.01)
(52) U.S. Cl.
CPC ..... *G01N 21/85* (2013.01); *G01N 2201/0633* (2013.01); *G01N 2201/0636* (2013.01); *G01N 2201/0638* (2013.01)
(58) Field of Classification Search
CPC .......... G01N 21/85; G01N 2201/0633; G01N 2201/0636; G01N 2201/0638; G01N 21/0303; G01N 21/031; G01N 2201/0668; G01N 21/05
USPC ........................................ 356/413
See application file for complete search history.

(56) References Cited

U.S. PATENT DOCUMENTS

| | | | | |
|---|---|---|---|---|
| 2016/0238525 A1* | 8/2016 | Yamada | ............ | G01N 21/4133 |
| 2019/0320877 A1* | 10/2019 | Sakai | .............. | A61B 1/063 |
| 2019/0366329 A1* | 12/2019 | John | .............. | G01N 21/01 |
| 2020/0187766 A1* | 6/2020 | Zalevsky | ........... | A61B 1/00186 |
| 2022/0260816 A1 | 8/2022 | Katsumata et al. | | |

FOREIGN PATENT DOCUMENTS

| | | | | |
|---|---|---|---|---|
| CN | 107820577 A | * | 3/2018 | .......... G02B 7/1828 |
| EP | 2071317 A1 | | 6/2009 | |
| EP | 3957978 A1 | | 2/2022 | |
| JP | H08271219 A | * | 10/1996 | |
| JP | 2006-194775 A | | 7/2006 | |
| JP | 2009-180665 A | | 8/2009 | |
| JP | 2010-286289 A | | 12/2010 | |
| JP | 2017-064621 A | | 4/2017 | |
| JP | 2022-124718 A | | 8/2022 | |

OTHER PUBLICATIONS

Extended (Supplementary) European Search Report dated Mar. 22, 2024, issued in counterpart EP Application No. 23200322.8. (10 pages).
Office Action dated Feb. 12, 2025, issued in counterpart JP Application No. 2022-155583, with English translation. (7 pages).

* cited by examiner

*Primary Examiner* — Md M Rahman
(74) *Attorney, Agent, or Firm* — WHDA, LLP (57) ABSTRACT

An optical device 1 includes: an optical element block 10 including optical elements that form an optical path P of light used for optical measurement, arranged around a measurement subject S so that the optical path P intersects the measurement subject S; and a rotation mechanism 20 configured to change an angle of the optical element block 10 relative to the measurement subject S so that the total length of the portion of the optical path P coincident with the measurement subject S changes.

10 Claims, 5 Drawing Sheets

OPTICAL DEVICE

CROSS-REFERENCE TO RELATED APPLICATION

The present application claims priority to and the benefit of Japanese Patent Application No. 2022-155583 filed Sep. 28, 2022, the entire contents of which are incorporated herein by reference.

TECHNICAL FIELD

The present disclosure relates to an optical device.

BACKGROUND

Technology for optical measurement of a measurement subject including a liquid to be measured is conventionally known. Such optical measurement is made by varying the optical path length of the light used for optical measurement at the measurement subject. For example, Patent Literature (PTL) 1 describes a variable optical path length cell that allows the optical path length to be changed without modifying the structure of the device.

CITATION LIST

Patent Literature

PTL 1: JP 2006-194775 A

SUMMARY

An optical device according to at least one embodiment comprises: an optical element block including optical elements configured to form an optical path of light used for optical measurement, arranged around a measurement subject so that the optical path intersects the measurement subject; and a rotation mechanism configured to change an angle of the optical element block relative to the measurement subject so that the total length of the portion of the optical path coincident with the measurement subject changes.

DETAILED DESCRIPTION

According to the variable optical path length cell described in PTL 1, an optical path length changing block needs to be inserted into the liquid to be measured in the cell, which obstructs the flow of the liquid to be measured and changes a pressure drop. That is, when the length of the portion of the optical path in the variable optical path length cell that passes through the measurement subject is changed, the liquid to be measured that is the measurement subject is physically affected.

It would be helpful to provide an optical device able to easily change the length of the portion of an optical path that passes through a measurement subject while suppressing effects on the measurement subject.

An optical device according to at least one embodiment comprises: an optical element block including optical elements configured to form an optical path of light used for optical measurement, arranged around a measurement subject so that the optical path intersects the measurement subject; and a rotation mechanism configured to change an angle of the optical element block relative to the measurement subject so that the total length of the portion of the optical path coincident with the measurement subject changes.

Accordingly, the length of the portion of the optical path that passes through the measurement subject may be easily changed while effects on the measurement subject may be suppressed. The optical device is able to easily change the total length of the portion of the optical path coincident with the measurement subject by changing the angle of the optical element block arranged outside the measurement subject relative to the measurement subject. The optical elements of the optical device that form the optical path are arranged around the measurement subject, and no elements are disposed, for example, in a liquid to be measured as the measurement subject, and therefore the effects on the measurement subject may be suppressed. The optical device is able to suppress physical effects on the measurement subject, such as changes in pressure drop and flow rate.

According to an embodiment of the optical device, the optical element block includes a frame to which the optical elements are attached, configured to surround the measurement subject, and the measurement subject is disposed centrally in the frame. Accordingly, the optical device is able to further suppress effects on the measurement subject when changing the optical path length of the portion of the optical path coincident with the measurement subject. When changing the optical path length, the optical device is able to easily and quickly change the optical path length and perform optical measurement without, for example, changing the size of the cell housing the liquid to be measured as the measurement subject or making other design changes. The optical device is able to flexibly change the optical path length.

According to an embodiment of the optical device, the rotation mechanism is attached to the optical element block and is configured to change the angle of the optical element block relative to the measurement subject by rotating the optical element block. Accordingly, the optical device is able to change the optical path length described above by manipulation of only the optical element block without any manipulation of the measurement subject. Accordingly, the optical device is able to further suppress effects on the measurement subject when changing the optical path length. In addition, the optical device is able to change the optical path length simply by rotating the optical element block. Thus, the optical device is able to easily and quickly change the optical path length to perform an optical measurement.

According to an embodiment of the optical device, the optical element block includes a first block and a second block configured to be rotated by the rotation mechanism, wherein the first block includes a first lens configured to cause collimated light to be incident on the measurement subject and a first mirror configured to reflect the collimated light transmitted through the measurement subject toward the second block.

Accordingly, the optical device is able to greatly change the optical path length of the portion of the optical path coincident with the measurement subject. For example, the optical device is able to vary the optical path length described above by an integer multiple of the width of the cell along the optical path, according to normal incidence of light on the cell and normal emission of light from the cell, by rotating the second block by the rotation mechanism. More specifically, the optical device is able to vary the optical path length between one and two times the length of the width of the cell along the optical path.

According to an embodiment of the optical device, the second block includes a second mirror configured to further reflect the collimated light and a second lens configured to condense the collimated light that is reflected.

Accordingly, the optical elements of the optical device through which light passes and light loss occurs may be limited to a pair of lenses. Therefore, the optical device is able keep optical loss substantially constant even when the optical path length of the portion of the optical path coincident with the measurement subject is changed. Thus, the optical device is able to suppress a decrease in signal intensity and signal-to-noise ratio of light that is transmitted through the optical device and detected. Accordingly, the optical device is able to easily obtain a desired signal intensity for light used in optical measurement, and to easily maintain measurement accuracy in optical measurement.

According to an embodiment of the optical device, the second block includes a third mirror configured to further reflect the collimated light to again be incident on the measurement subject, and a third lens configured to condense the collimated light transmitted through the measurement subject. Accordingly, the optical elements of the optical device through which light passes and light loss occurs may be limited to a pair of lenses. Therefore, the optical device achieves a similar effect to that described above, regarding measurement accuracy in optical measurement.

According to an embodiment of the optical device, the optical element block further includes a third block, wherein the second block includes a fourth mirror configured to further reflect the collimated light to again be incident on the measurement subject, and a fifth mirror configured to further reflect the collimated light transmitted through the measurement subject toward the third block, wherein the third block includes a sixth mirror configured to further reflect the collimated light to again be incident on the measurement subject, and a fourth lens configured to condense the collimated light transmitted through the measurement subject.

Accordingly, the optical device is able to greatly change the optical path length of the portion of the optical path coincident with the measurement subject. For example, the optical device is able to vary the optical path length described above by an integer multiple of the width of the cell along the optical path, according to normal incidence of light on the cell and normal emission of light from the cell, by rotating the second block by the rotation mechanism. More specifically, the optical device is able to vary the optical path length between one, two, and three times the length of the width of the cell along the optical path.

According to an embodiment of the optical device, the frame includes a first frame, a second frame, and a third frame, the first block includes the first frame that has a rectangular shape, the second block includes a second frame that has a hexagonal shape, and the third block includes the third frame that has a rectangular shape.

Accordingly, the optical device is able to improve the rotational symmetry of each frame relative to the cell. Therefore, the optical device is able to easily realize different optical systems by rotational movement of a frame by the rotation mechanism.

According to an embodiment of the optical device, the measurement subject includes a liquid to be measured housed in a cell. Accordingly, the optical device is able to easily perform optical measurement using the optical path for a liquid to be measured flowing in one direction in the cell, for example.

According to an embodiment of the optical device, a cross-section of the cell has a square shape when viewed from an extension direction of the cell. Accordingly, the optical device is able to improve the rotational symmetry of component parts, including the cell and each of the frames.

According to the present disclosure, the optical device is provided that is able to easily change the length of the portion of the optical path that passes through the measurement subject while suppressing effects on the measurement subject.

Background and problems of conventional technology are described in more detail.

The variable optical path length cell described in PTL 1 includes a cell body having a light input window and a light output window made of transparent flat plates arranged parallel to each other, and in which a liquid to be measured is housed or flows through. The variable optical path length cell includes an optical path length changing block made of transparent material that has a plurality of flat surface pairs and is removably insertable into the cell body.

The optical path length may be changed in steps by selecting a flat surface pair of any thickness from the plurality of flat surface pairs of the optical path length changing block, and inserting the optical path length changing block into the optical path in the cell. An absorbance measurement method using the variable optical path length cell described above enables absorbance measurement at a plurality of optical path lengths by fixing the cell body relative to the optical path of a measurement light and moving the optical path length changing block in a direction across the optical path of the measurement light.

However, the variable optical path length cell described in PTL 1 has the following problems.

According to the variable optical path length cell described in PTL 1, the optical path length changing block needs to be inserted into and immersed in the liquid to be measured in the cell body, which obstructs the flow of the liquid to be measured and changes a pressure drop. That is, when the length of the portion of the optical path in the variable optical path length cell that passes through the measurement subject is changed, the liquid to be measured that is the measurement subject is physically affected.

According to the variable optical path length cell described in PTL 1, when the optical path length changing block immersed in the liquid to be measured is contaminated by the liquid to be measured, the optical path length changing block needs to be washed. Therefore, a great deal of effort is required to maintain the equipment related to optical measurement using the variable optical path length cell.

According to the variable optical path length cell described in PTL 1, the optical path length changing block is disposed across the optical path as a transmissive optical member. Therefore, light loss occurs due to interfacial reflection based on a refractive index difference between the optical path length changing block as a transmissive optical member and the liquid to be measured. Light loss also occurs due to absorption based on light absorption properties of the optical path length changing block itself. This light loss results in reduced measurement accuracy in optical measurement.

In order to solve the problems described above, it would be helpful to provide an optical device able to easily change the length of the portion of an optical path that passes through a measurement subject while suppressing effects on the measurement subject. It would also be helpful to provide an optical device that is able to flexibly change the optical path length through the measurement subject and easily obtain a desired signal intensity for light used for optical measurement.

Embodiments of the present disclosure are described below, with reference to the accompanying drawings.

First Embodiment

Figure 1:
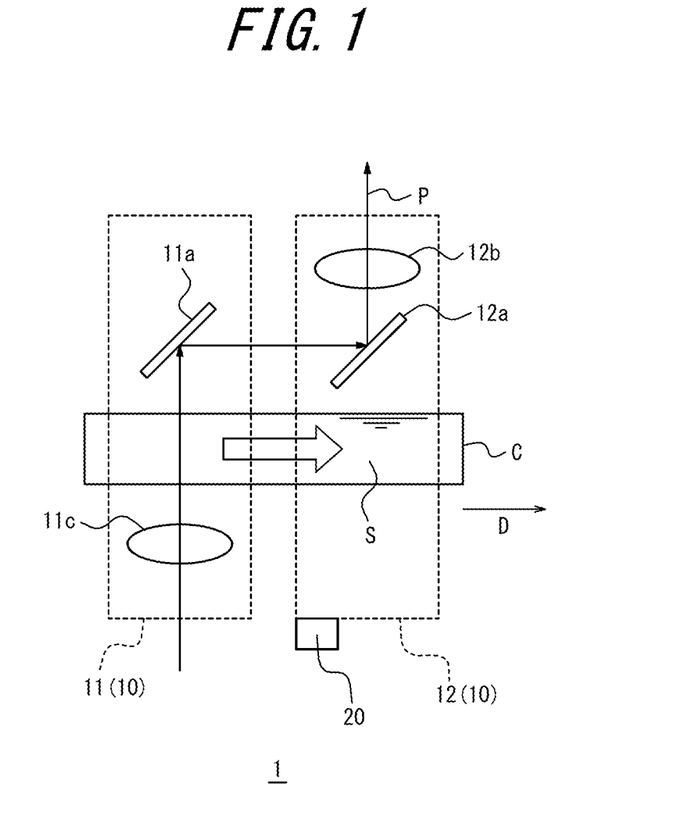
FIG. 1 is a schematic diagram illustrating a schematic configuration of an optical device according to a first embodiment of the present disclosure.

FIG. 1 is a schematic diagram illustrating a schematic configuration of an optical device 1 according to a first embodiment of the present disclosure. In FIG. 1, for ease of understanding, only those of the optical elements described below with reference to FIG. 2 and FIG. 3 that directly contribute to the formation of an optical path P of light used for an optical measurement are illustrated. FIG. 1 illustrates the optical device 1 and a cell C from a side view perpendicular to an extension direction D of the cell C in which a measurement subject S flows in one direction.

The optical device 1 is used to form the optical path P of light used for optical measurement with respect to the measurement subject S. In the present disclosure, "measurement subject S" includes, for example, a liquid to be measured that is housed in the cell C and flows in one direction. "Optical measurement" includes, for example, measuring the light absorption properties of the measurement subject S, as indicated by an absorption spectrum, and the like. "Light" includes, for example, light to be measured from any light source disposed outside the optical device 1, such as light to be measured as transmitted light incident on the optical device 1 and transmitted through the measurement subject S. "Optical path P" includes, for example, the entire path of light formed by the optical device 1.

The optical device 1 includes an optical element block 10 and a rotation mechanism 20.

The optical element block 10 includes optical elements that form the optical path P of light used for optical measurement, arranged around the measurement subject S so that the optical path P intersects the measurement subject S. The measurement subject S is housed in the cell C, for example, and exists in an interior space of the cell C. The optical element block 10 is arranged around the cell C that houses the measurement subject S and is disposed outside the cell C. According to the first embodiment, the optical element block 10 includes a first block 11 and a second block 12 that is rotated by the rotation mechanism 20.

Figure 2:
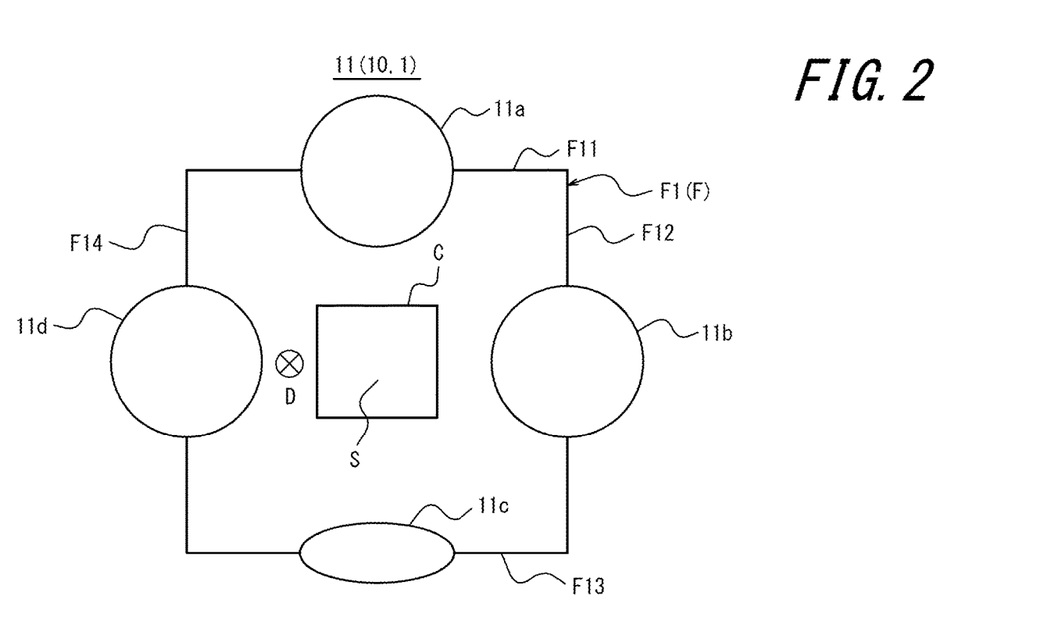
FIG. 2 is a schematic diagram illustrating an example of a configuration of a first block illustrated in FIG. 1.
Figure 3:
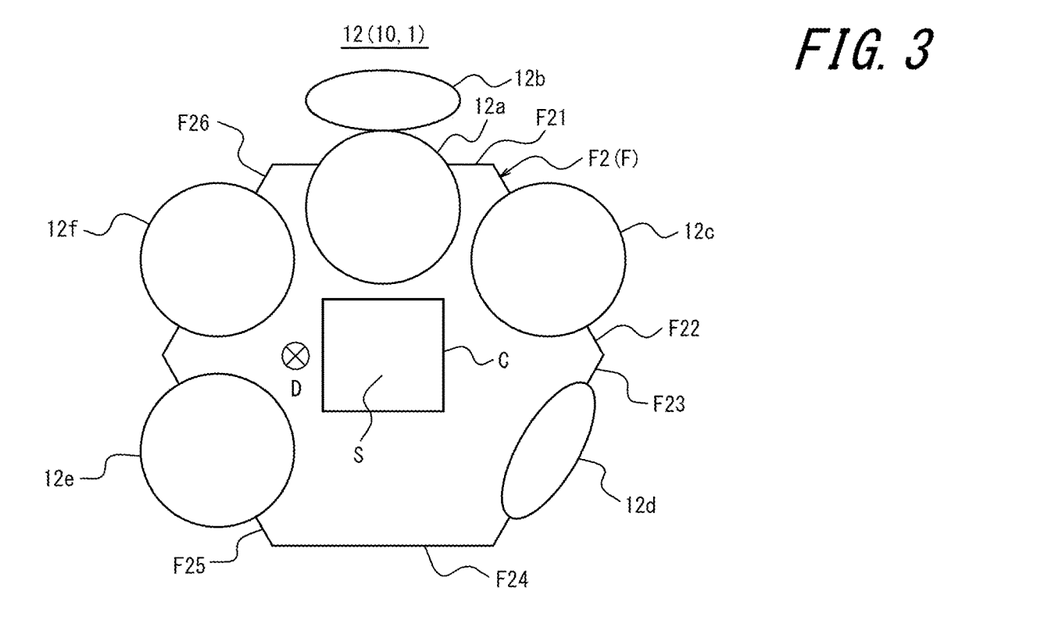
FIG. 3 is a schematic diagram illustrating an example of a configuration of a second block illustrated in FIG. 1.

FIG. 2 is a schematic diagram illustrating an example of a configuration of the first block 11 illustrated in FIG. 1. FIG. 3 is a schematic diagram illustrating an example of a configuration of the second block 12 illustrated in FIG. 1. FIG. 2 and FIG. 3, unlike FIG. 1, illustrate the optical device 1 and the cell C from a frontal view along the extension direction D of the cell C. In the drawing of FIG. 1, when the liquid to be measured as the measurement subject S flows from left to right in the cell C, then in the drawings of FIG. 2 and FIG. 3, for example, the liquid to be measured flows in the cell C from the front of the paper surface toward the back. As illustrated in FIG. 2 and FIG. 3, a cross-section of the cell C when viewed from the extension direction D of the cell C has a square shape. Referring primarily to FIG. 2 and FIG. 3, the following explanation focuses on an example configuration of the first block 11 and the second block 12 illustrated in FIG. 1.

The optical element block 10 includes a frame F to which optical elements are attached and which surrounds the measurement subject S. The frame F is formed of any metal material, resin material, or the like used in optical systems. The optical element block 10 has the measurement subject S disposed centrally in the frame F. According to the first embodiment, the frame F includes a first frame F1 and a second frame F2.

As illustrated in FIG. 2, the first block 11 includes the first frame F1 that has a rectangular shape. The first block 11 is formed hollow and has the cell C disposed centrally. The four edges constituting the first frame F1 of the first block 11 are arranged around the cell C so that the cell C disposed centrally in the first block 11 is surrounded from four directions. In FIG. 2, the first frame F1 has a first side F11 disposed above, a second side F12 disposed to the right, a third side F13 disposed below, and a fourth side F14 disposed to the left.

The first block 11 is a hollow square block in which a plurality of optical elements, including, for example, an optical element for condensing and an optical element for reflection, are held on sides of the first frame F1. When a plurality of holders are integral to the first frame F1, for example, the first block 11 holds the plurality of optical elements by appropriately attaching the plurality of optical elements to the plurality of holders.

More specifically, the first block 11 includes a mirror 11a attached to the first side F11. The first block 11 includes a mirror 11b attached to the second side F12. The first block 11 includes a lens 11c attached to the third side F13. The first block 11 includes a mirror 11d attached to the fourth side F14. The mirrors 11a, 11b, and 11d are attached to the frame F1 to be tilted 45° to the right or left relative to the extension direction D of the cell C in the side view as illustrated in FIG. 1.

As illustrated in FIG. 3, the second block 12 includes the second frame F2 that has a hexagonal shape. The second block 12 is formed hollow and has the cell C disposed centrally. The six edges constituting the second frame F2 of the second block 12 are arranged around the cell C so that the cell C disposed centrally in the second block 12 is surrounded from six directions. In FIG. 3, the second frame F2 has a first side F21 disposed above, a second side F22 disposed on the upper right, a third side F23 disposed on the lower right, a fourth side F24 disposed below, a fifth side F25 disposed on the lower left and a sixth side F26 disposed on the upper left.

The second block 12 is a hollow regular hexagonal block in which a plurality of optical elements including, for example, an optical element for condensing, an optical element for reflection, and combinations thereof, are held on sides of the second frame F2. When a plurality of holders are integral to the second frame F2, for example, the second block 12 holds the plurality of optical elements by appropriately attaching the plurality of optical elements to the plurality of holders.

More specifically, the second block 12 includes a combination of a mirror 12a and a lens 12b attached to the first side F21. The second block 12 includes a mirror 12c attached to the second side F22. The second block 12 includes a lens 12d attached to the third side F23. The second block 12 includes a mirror 12e attached to the fifth side F25. The second block 12 includes a mirror 12f attached to the sixth side F26. The mirrors 12a, 12c, 12e, and 12f are attached to the second frame F2 to be tilted 45° to the right or left relative to the extension direction D of the cell C in the side view as illustrated in FIG. 1.

The rotation mechanism 20 changes the angle of the optical element block 10 relative to the measurement subject S so that the total length of the portion of the optical path P coincident with the measurement subject S changes. For example, the rotation mechanism 20 is attached to the optical element block 10 and changes the angle of the optical element block 10 relative to the measurement subject S by rotating the optical element block 10. As illustrated in FIG. 1, according to the first embodiment, the rotation mechanism 20 is attached to the second block 12 of the optical element block 10, for example, and the angle of the second block 12 relative to the measurement subject S is changed by rotating the second block 12.

In the example optical system illustrated in FIG. 1, the optical device 1 forms the optical path P while maintaining a defined angle for each of the first block 11 and the second block 12. For example, after being rotated by the rotation mechanism 20, the second block 12 maintains the angle illustrated in FIG. 1 as an example.

In the side view of FIG. 1, the first side F11 of the first block 11 is disposed above the cell C. The second side F12 of the first block 11 is disposed in front of the cell C. The third side F13 of the first block 11 is disposed below the cell C. The fourth side F14 of the first block 11 is disposed on the far side of the cell C.

The mirror 11a attached to the first side F11 of the first block 11 is disposed above the cell C, tilted to face the second block 12. The lens 11c attached to the third side F13 of the first block 11 is disposed below the cell C, facing the cell C. In FIG. 1, the mirrors 11b and 11d are disposed in front of and on the far side of the cell C, respectively, but these optical elements, which do not directly contribute to the formation of the optical path P, are omitted from the drawing.

In the side view of FIG. 1, the first side F21 of the second block 12 is disposed above the cell C. The second side F22 of the second block 12 is disposed on the upper front side of the cell C. The third side F23 of the second block 12 is disposed on the lower front side of the cell C. The fourth side F24 of the second block 12 is disposed below the cell C. The fifth side F25 of the second block 12 is disposed on the lower far side of the cell C. The sixth side F26 of the second block 12 is disposed on the upper far side of the cell C.

The combination of the mirror 12a and the lens 12b attached to the first side F21 of the second block 12 is disposed above the cell C. The mirror 12a is tilted to face the first block 11 and the lens 12b. In FIG. 1, the mirror 12c, the lens 12d, the mirror 12e, and the mirror 12f are disposed on the upper front, lower front, lower far, and upper far sides of the cell C, respectively, but these optical elements, which do not directly contribute to the formation of the optical path P, are omitted from the drawing.

The optical device 1 causes light to be incident on the third side F13 of the first block 11, where the lens 11c as a collimating light means is attached. The lens 11c collimates light incident on the optical device 1 into collimated light and causes the collimated light to be incident on the measurement subject S. The lens 11c corresponds to the "first lens" described in the claims. The optical device 1 causes the collimated light to be transmitted through the cell C housing the liquid to be measured as the measurement subject S.

The optical device 1 causes the collimated light transmitted through the cell C to be incident on the mirror 11a, which is attached to the first frame F1 to be tilted 45° to the left in the first block 11 relative to the extension direction D of the cell C. The mirror 11a reflects the collimated light transmitted through the measurement subject S toward the second block 12. The mirror 11a corresponds to the "first mirror" described in the claims. The mirror 11a reflects the collimated light 90° and causes the collimated light to be incident on the second block 12.

The optical device 1 causes the collimated light reflected 90° at the mirror 11a to be incident on the mirror 12a, which is attached to the second frame F2 to be tilted 45° to the left in the second block 12 relative to the extension direction D of the cell C. The mirror 12a further reflects the collimated light toward the lens 12b. The mirror 12a corresponds to the "second mirror" described in the claims. The mirror 12a reflects the collimated light 90° and causes the collimated light to be incident on the lens 12b.

The lens 12b condenses the collimated light reflected by the mirror 12a. The lens 12b corresponds to the "second lens" described in the claims. The lens 12b condenses the collimated light and guides the light to a detector such as a photodetector or the like, or an optical transmission line such as an optical fiber or the like disposed outside the optical device 1.

The optical device 1 adjusts the angle of the second block 12 by using the rotation mechanism 20 so that the sides parallel to the cell C are a pair of the first side F21 and the fourth side F24. Accordingly, the optical device 1 forms the optical path P so that light is transmitted once through the cell C housing the liquid to be measured as the measurement subject S, or in other words, once through the measurement subject S. The optical path P is normal to the cell C. That is, in one transmission, the collimated light is normally incident on one surface of the cell C and is emitted normally from another surface.

Figure 4:
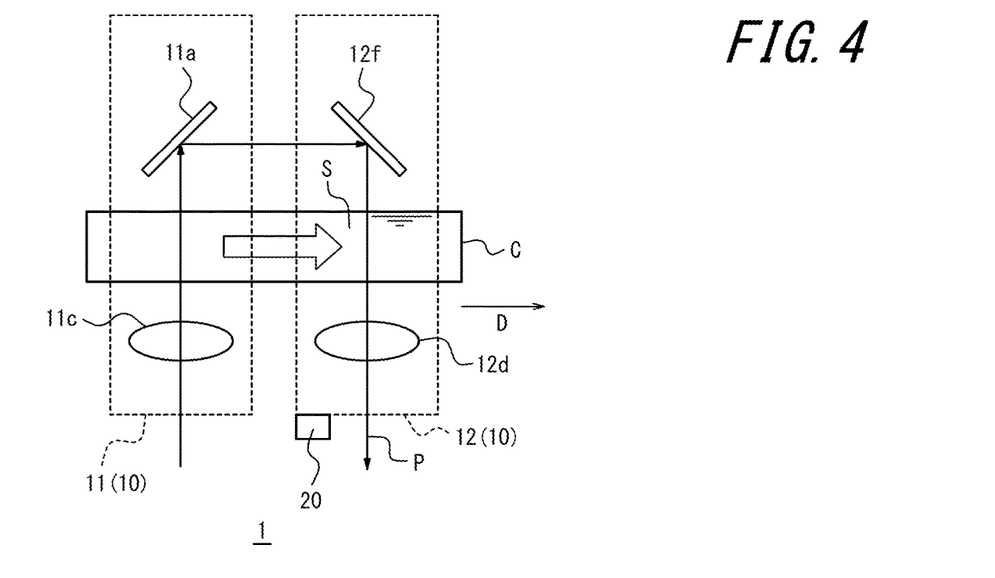
FIG. 4 is a schematic diagram corresponding to FIG. 1, illustrating another example of an optical system of the optical device illustrated in FIG. 1.

FIG. 4 is a schematic diagram corresponding to FIG. 1, illustrating another example of an optical system of the optical device 1 illustrated in FIG. 1. In FIG. 4, the angle of the first block 11 relative to the cell C is the same as the angle illustrated in FIG. 1, but the angle of the second block 12 relative to the cell C differs from the angle illustrated in FIG. 1.

In the other example of the optical system illustrated in FIG. 4, the optical device 1 forms the optical path P while maintaining a defined angle for each of the first block 11 and the second block 12. For example, after being rotated by the rotation mechanism 20, the second block 12 maintains the angle illustrated in FIG. 4 as an example.

In the side view of FIG. 4, the sixth side F26 of the second block 12 is disposed above the cell C. The first side F21 of the second block 12 is disposed on the upper front side of the cell C. The second side F22 of the second block 12 is disposed on the lower front side of the cell C. The third side F23 of the second block 12 is disposed below the cell C. The fourth side F24 of the second block 12 is disposed on the lower far side of the cell C. The fifth side F25 of the second block 12 is disposed on the upper far side of the cell C.

The mirror 12f attached to the sixth side F26 of the second block 12 is disposed above the cell C. The mirror 12f is tilted to face the first block 11 and the cell C. The lens 12d attached to the third side F23 of the second block 12 is disposed below the cell C, facing the cell C. In FIG. 4, the combination of the mirror 12a and the lens 12b, the mirror 12c, and the mirror 12e are disposed on the upper front, lower front, and upper far sides of the cell C, respectively, but these optical elements, which do not directly contribute to the formation of the optical path P, are omitted from the drawing.

The optical device 1 causes light to be incident on the third side F13 of the first block 11, where the lens 11c as a collimating light means is attached. The lens 11c collimates light incident on the optical device 1 into collimated light and causes the collimated light to be incident on the measurement subject S. The optical device 1 causes the collimated light to be transmitted through the cell C housing the liquid to be measured as the measurement subject S.

The optical device 1 causes the collimated light transmitted through the cell C to be incident on the mirror 11a, which is attached to the first frame F1 to be tilted 45° to the left in the first block 11 relative to the extension direction D of the cell C. The mirror 11a reflects the collimated light transmitted through the measurement subject S toward the second block 12. The mirror 11a reflects the collimated light 90° and causes the collimated light to be incident on the second block 12.

The optical device 1 causes the collimated light reflected 90° by the mirror 11a to be incident on the mirror 12f, which is attached to the second frame F2 to be tilted 45° to the right in the second block 12 relative to the extension direction D of the cell C. The mirror 12f further reflects the collimated light toward the cell C to again be incident on the measurement subject S. The mirror 12f corresponds to the "third mirror" described in the claims. The mirror 12f reflects the collimated light 90° and causes the collimated light to be incident on the measurement subject S.

The lens 12d condenses the collimated light transmitted through the measurement subject S. The lens 12d corresponds to the "third lens" described in the claims. The lens 12d condenses the collimated light and guides the light to a detector such as a photodetector or the like, or an optical transmission line such as an optical fiber or the like disposed outside the optical device 1.

The optical device 1 adjusts the angle of the second block 12 by using the rotation mechanism 20 so that the sides parallel to the cell C are a pair of the sixth side F26 and the third side F23. Accordingly, the optical device 1 forms the optical path P so that light is transmitted twice through the cell C housing the liquid to be measured as the measurement subject S, or in other words, twice through the measurement subject S. The optical path P is normal to the cell C. That is, in both of the transmissions, the collimated light is normally incident on one surface of the cell C and is emitted normally from another surface.

According to the optical device 1 pertaining to the first embodiment described above, the length of the portion of the optical path P that passes through the measurement subject S is easily changed while suppressing effects on the measurement subject S. The optical device 1 is able to easily change the total length of the portion of the optical path P coincident with the measurement subject S by changing the angle of the optical element block 10 arranged outside the measurement subject S relative to the measurement subject S. The optical elements of the optical device 1 that form the optical path P are arranged around the measurement subject S, and no elements are disposed, for example, in the liquid to be measured as the measurement subject S, and therefore the effects on the measurement subject S may be suppressed. The optical device 1 is able to suppress physical effects on the measurement subject S, such as changes in pressure drop and flow rate.

The optical device 1 does not immerse any element in the liquid to be measured as the measurement subject S, and therefore does not require the work of cleaning any element contaminated by the liquid to be measured. Thus, the generation of a great deal of labor is suppressed in the maintenance of equipment related to optical measurement using the optical device 1. The optical device 1 does not require any element to be directly inserted into the cell C, and therefore leakage of the liquid to be measured from the cell C due to such insertion is also suppressed.

The optical device 1 is able to further suppress effects on the measurement subject S when changing the optical path length of the portion of the optical path P coincident with the measurement subject S by having the optical element block 10 position the measurement subject S centrally in the frame F. When changing the optical path length, the optical device 1 is able to easily and quickly change the optical path length and perform optical measurement without, for example, changing the size of the cell C housing the liquid to be measured as the measurement subject S or making other design changes. The optical device 1 is able to flexibly change the optical path length.

The optical device 1 is able to change the optical path length described above by manipulation of only the optical element block 10 without any manipulation of the measurement subject S, as the rotation mechanism 20 rotates the optical element block 10 to change the angle of the optical element block 10 relative to the measurement subject S. Accordingly, the optical device 1 is able to further suppress effects on the measurement subject S when changing the optical path length. In addition, the optical device 1 is able to change the optical path length simply by rotating the optical element block 10. Thus, the optical device 1 is able to easily and quickly change the optical path length to perform an optical measurement.

The optical device 1 includes the first block 11 and the second block 12 that is rotated by the rotation mechanism 20, which allows the optical path length of the portion of the optical path P coincident with the measurement subject S to be greatly varied, as illustrated in FIG. 1 and FIG. 4, for example. For example, the optical device 1 is able to vary the optical path length described above by an integer multiple of the width of the cell C along the optical path P, according to normal incidence of light on the cell C and normal emission of light from the cell C, by rotating the second block 12 by the rotation mechanism 20. More specifically, the optical device 1 is able to vary the optical path length between one and two times the length of the width of the cell C along the optical path P.

The optical device 1 includes the first block 11 that has the lens 11c and the mirror 11a and the second block 12 that has the mirror 12a and the lens 12b, and therefore the optical elements of the optical device 1 through which light passes and light loss occurs may be limited to the pair of the lens 11c and the lens 12b. Therefore, the optical device 1 is able to keep optical loss substantially constant even when the optical path length of the portion of the optical path P coincident with the measurement subject S is changed between the optical systems illustrated in FIG. 1 and FIG. 4, for example. Thus, the optical device 1 is able to suppress a decrease in signal intensity and signal-to-noise ratio of light that is transmitted through the optical device 1 and detected. Accordingly, the optical device 1 is able to easily obtain a desired signal intensity for light used in optical measurement, and to easily maintain measurement accuracy in optical measurement.

The optical device 1 includes the first block 11 that has the lens 11c and the mirror 11a and the second block 12 that has the mirror 12f and the lens 12d, and therefore the optical elements of the optical device 1 through which light passes and light loss occurs may be limited to the pair of the lens 11c and the lens 12d. Therefore, the optical device 1 achieves a similar effect to that described above, regarding measurement accuracy in optical measurement.

The optical device 1 is able to improve the rotational symmetry of each frame of the frame F relative to the cell C by including the first block 11 that includes the first frame F1 that has a rectangular shape and the second block 12 that includes the second frame F2 that has a hexagonal shape. Accordingly, the optical device 1 is able to easily realize different optical systems, as illustrated in FIG. 1 and FIG. 4, by the rotational movement of the frame F by the rotation mechanism 20.

The optical device 1 is able to easily perform optical measurement using the optical path P for the liquid to be measured flowing in one direction in the cell C, for example, as the liquid to be measured housed in the cell C is included as the measurement subject S.

The optical device 1 is able to improve the rotational symmetry of component parts, including the cell C and each frame of the frame F, by having a square-shaped cross-section of the cell C when viewed from the extension direction D of the cell C.

According to the first embodiment, the measurement subject S is described as including, for example, a liquid to be measured that is housed in the cell C and flows in one direction, but the measurement subject S is not limited to this. The measurement subject S may include, for example, a liquid to be measured that is housed in the cell C and stays in place without flowing in one direction. The measurement subject S is not limited to a liquid such as a liquid to be measured and may include a solid having any cross-sectional shape, such as rectangular, square, other polygonal, circular, and elliptical shapes, and may include a gas.

According to the first embodiment, the optical measurement is described as including, for example, measuring light absorption properties of the measurement subject S indicated by an absorption spectrum, but the optical measurement is not limited to this. The optical measurement may include measuring fluorescence properties of the measurement subject S, indicated for example by a fluorescence spectrum. The optical measurement may include measuring the scattering characteristics of light of the measurement subject S, indicated for example by a scattered light spectrum.

According to the first embodiment, light is described as including, for example, light to be measured from any light source disposed outside the optical device 1, such as light to be measured as transmitted light that is incident on the optical device 1 and transmitted through the measurement subject S, but the light is not limited to this. The light may include, for example, fluorescence or excitation light to generate scattered light from the measurement subject S. In such a case, the optical device 1 may be configured so that some of the mirrors as reflection means among the optical elements of the first block 11 and the second block 12 are changed to wavelength separation elements, and a signal light from the measurement subject S based on the excitation light is extracted from the wavelength separation elements. Accordingly, the optical device 1 is applicable not only to transmission measurement devices but also to fluorometric measurement devices or scattered light measurement devices among optical measurement technologies with respect to the measurement subject S.

According to the first embodiment, the optical element block 10 is described as having the measurement subject S disposed centrally in the frame F, but is not limited to this. The optical element block 10 may have the measurement subject S disposed at any other position in the frame F other than centrally.

According to the first embodiment, the first block 11 is described as including optical elements in the arrangement illustrated in FIG. 2, but is not limited to this. The arrangement and type of optical elements that the first block 11 includes may be any able to vary the total length of the portion of the optical path P coincident with the measurement subject S. For example, the first block 11 need not include the lens 11c. In such a case, any lens that has a function of causing collimated light to be incident on the measurement subject S may be disposed outside and immediately in front of the optical device 1.

According to the first embodiment, the second block 12 is described as including optical elements in the arrangement illustrated in FIG. 3, but is not limited to this. The arrangement and type of optical elements that the second block 12 includes may be any able to vary the total length of the portion of the optical path P coincident with the measurement subject S. For example, the second block 12 need not include at least one of the lens 12b and the lens 12d. In such a case, any lens that has a function of condensing collimated light may be disposed immediately outside the optical device 1.

According to the first embodiment, the first block 11 is described as including the first frame F1 that has a rectangular shape, but the first frame F1 is not limited to this. The first frame F1 may have any shape, including any other polygonal, circular, and elliptical shape, instead of a rectangular shape such as a rectangle or square.

According to the first embodiment, the second block 12 is described as including the second frame F2 that has a hexagonal shape, but the second frame F2 is not limited to this. The first frame F1 may have any shape, including any other polygonal, circular, and elliptical shape, instead of a hexagonal shape such as a regular hexagon.

According to the first embodiment, the cross-section of the cell C when viewed from the extension direction D of the cell C is described as having a square shape, but is not limited to this. The cross-section of the cell C when viewed from the extension direction D of the cell C may have any shape other than square, including any other rectangular, other polygonal, circular, and elliptical shape.

According to the first embodiment, the rotation mechanism 20 is described, for example, as being attached to the second block 12 of the optical element block 10, and changing the angle of the second block 12 relative to the measurement subject S by rotating the second block 12, but the rotation mechanism 20 is not limited to this. The rotation mechanism 20 may be attached to the first block 11 instead of or in addition to the second block 12.

Second Embodiment

Figure 5:
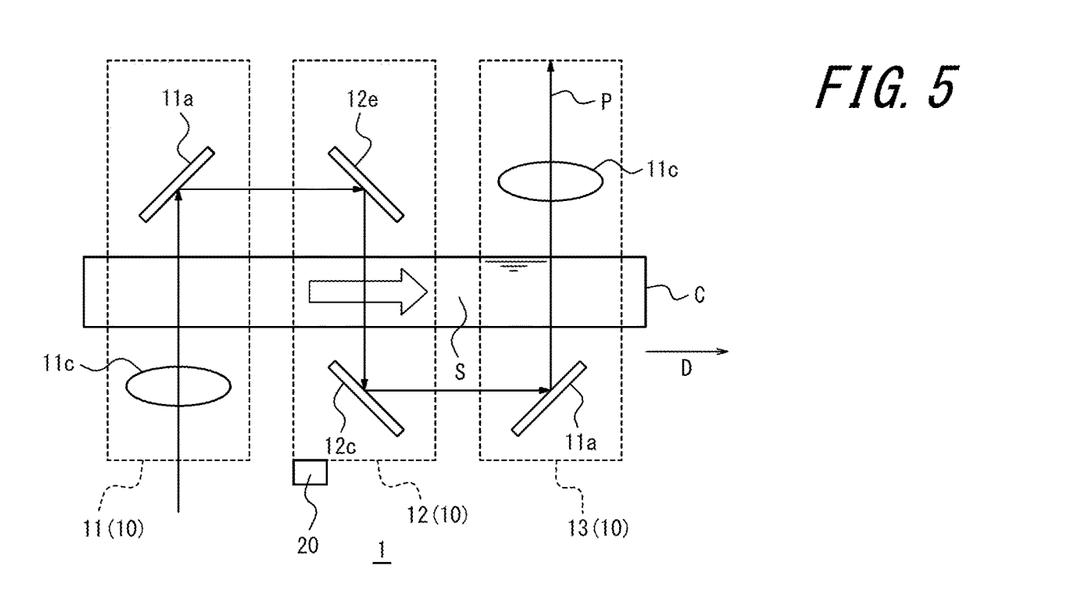
FIG. 5 is a schematic diagram corresponding to FIG. 1, illustrating a schematic configuration of the optical device according to a second embodiment of the present disclosure.

FIG. 5 is a schematic diagram corresponding to FIG. 1, illustrating a schematic configuration of the optical device 1 according to a second embodiment of the present disclosure. Configuration and functions of the optical device 1 according to the second embodiment are described with reference to FIG. 5. The optical device 1 according to the second embodiment differs from that of the first embodiment in that the optical element block 10 further includes a third block 13.

Other configurations, functions, effects, variations, and the like are the same as in first embodiment, and the corresponding descriptions also apply to the optical device 1 according to the second embodiment. In the following, the same symbols are used for the same components as in the first embodiment, and descriptions thereof are not repeated. The main points that differ from the first embodiment are explained below.

According to the second embodiment, the optical element block 10 further includes the third block 13. The third block 13 is exactly the same as the first block 11 illustrated in FIG. 2, but in FIG. 5 is disposed with respect to the cell C rotated 180° relative to the first block 11. According to the second embodiment, the frame F includes, in addition to the first block 11 that includes the first frame F1 and the second block F2 that includes the second frame F2, the third block 13 that includes a third frame F3. The third frame F3 is exactly the same as the first frame F1 and has a rectangular shape.

As illustrated in FIG. 5, according to the second embodiment, the rotation mechanism 20 is attached to the second block 12 of the optical element block 10, for example, and the angle of the second block 12 relative to the measurement subject S is changed by rotating the second block 12.

In the example optical system illustrated in FIG. 5, the optical device 1 forms the optical path P while maintaining a defined angle for each of the first block 11, the second block 12, and the third block 13. For example, after being rotated by the rotation mechanism 20 the second block 12 maintains the angle illustrated in FIG. 5 as an example.

In the side view of FIG. 5, the fifth side F25 of the second block 12 is disposed above the cell C. The sixth side F26 of the second block 12 is disposed on the upper front side of the cell C. The first side F21 of the second block 12 is disposed on the lower front side of the cell C. The second side F22 of the second block 12 is disposed below the cell C. The third side F23 of the second block 12 is disposed on the lower far side of the cell C. The fourth side F24 of the second block 12 is disposed on the upper far side of the cell C.

The mirror 12e attached to the fifth side F25 of the second block 12 is disposed above the cell C. The mirror 12e is tilted to face the first block 11 and the cell C. The mirror 12c attached to the second side F22 of the second block 12 is disposed below the cell C. The mirror 12c is tilted to face the third block 13 and the cell C. In FIG. 5, the mirror 12f, the combination of the mirror 12a and the lens 12b, and the lens 12d are disposed on the upper front, lower front, and lower far sides of the cell C, respectively, but these optical elements, which do not directly contribute to the formation of the optical path P, are omitted from the drawing.

In the side view of FIG. 5, the third side F13 of the third block 13 is disposed above the cell C. The fourth side F14 of the third block 13 is disposed in front of the cell C. The first side F11 of the third block 13 is disposed below the cell C. The second side F12 of the third block 13 is disposed on the far side of the cell C.

The mirror 11a attached to the first side F11 of the third block 13 is disposed below the cell C, tilted to face the second block 12 and the cell C. The lens 11c attached to the third side F13 of the third block 13 is disposed above the cell C, facing the cell C. In FIG. 5, the mirrors 11b and 11d are disposed in front of and on the far side of the cell C, respectively, but these optical elements, which do not directly contribute to the formation of the optical path P, are omitted from the drawing.

The optical device 1 causes light to be incident on the third side F13 of the first block 11, where the lens 11c as a collimating light means is attached. The lens 11c collimates light incident on the optical device 1 into collimated light and causes the collimated light to be incident on the measurement subject S. The optical device 1 causes the collimated light to be transmitted through the cell C housing the liquid to be measured as the measurement subject S.

The optical device 1 causes the collimated light transmitted through the cell C to be incident on the mirror 11a, which is attached to the first frame F1 to be tilted 45° to the left in the first block 11 relative to the extension direction D of the cell C. The mirror 11a reflects the collimated light transmitted through the measurement subject S toward the second block 12. The mirror 11a reflects the collimated light 90° and causes the collimated light to be incident on the second block 12.

The optical device 1 causes the collimated light reflected 90° by the mirror 11a to be incident on the mirror 12e, which is attached to the second frame F2 to be tilted 45° to the right in the second block 12 relative to the extension direction D of the cell C. The mirror 12e further reflects the collimated light toward the cell C to again be incident on the measurement subject S. The mirror 12e corresponds to the "fourth mirror" described in the claims. The mirror 12e reflects the collimated light 90° and causes the collimated light to be incident on the measurement subject S.

The optical device 1 causes the collimated light transmitted through the cell C to be incident on the mirror 11c, which is attached to the second frame F2 to be tilted 45° to the left in the second block 12 relative to the extension direction D of the cell C. The mirror 12c further reflects the collimated light transmitted through the measurement subject S toward the third block 13. The mirror 12c corresponds to the "fifth mirror" described in the claims. The mirror 12c reflects the collimated light 90° and causes the collimated light to be incident on the third block 13.

The optical device 1 causes the collimated light reflected 90° at the mirror 11c to be incident on the mirror 11a, which is attached to the third frame F3 to be tilted 45° to the left in the third block 13 relative to the extension direction D of the cell C. The mirror 11a further reflects the collimated light toward the cell C to again be incident on the measurement subject S. The mirror 11a corresponds to the "sixth mirror" described in the claims. The mirror 11a reflects the collimated light 90° and causes the collimated light to be incident on the measurement subject S.

The lens 11c condenses the collimated light transmitted through the measurement subject S. The lens 11c here corresponds to the "fourth lens" described in the claims. The lens 11c condenses the collimated light and guides the light to a detector such as a photodetector or the like, or an optical transmission line such as an optical fiber or the like disposed outside the optical device 1.

The optical device 1 adjusts the angle of the second block 12 by using the rotation mechanism 20 so that the sides parallel to the cell C are a pair of the fifth side F25 and the second side F22. Accordingly, the optical device 1 forms the optical path P so that light is transmitted three times through the cell C housing the liquid to be measured as the measurement subject S, or in other words, three times through the measurement subject S. The optical path P is normal to the cell C. That is, in all three of the transmissions, the collimated light is normally incident on one surface of the cell C and is emitted normally from another surface. The optical device 1 is also able to form the optical path P illustrated in FIGS. 1 and 4 using only the first block 11 and the second block 12 by adjusting the second block 12 to the angle illustrated in FIG. 1 and FIG. 4 by using the rotation mechanism 20.

The optical device 1 includes the first block 11, the second block 12 that is rotated by the rotation mechanism 20, and also the third block 13, which allows the optical path length of the portion of the optical path P coincident with the measurement subject S to be greatly varied, as illustrated in FIG. 5, for example. For example, the optical device 1 is able to vary the optical path length described above by an integer multiple of the width of the cell C along the optical path P, according to normal incidence of light on the cell C and normal emission of light from the cell C, by rotating the second block 12 by the rotation mechanism 20. More specifically, the optical device 1 is able to vary the optical path length between one, two, and three times the length of the width of the cell C along the optical path P.

The optical device 1 includes the first block 11 that includes the lens 11c and the mirror 11a, the second block 12 that includes the mirror 12e and the mirror 12c, and the third block 13 that includes the mirror 11a and the lens 11c, and therefore the optical elements of the optical device 1 through which light passes and light loss occurs may be limited to the pair of the lens 11c. Therefore, the optical device 1 is able keep optical loss substantially constant even when the optical path length of the portion of the optical path P coincident with the measurement subject S is changed. Thus, the optical device 1 is able to suppress a decrease in signal intensity and signal-to-noise ratio of light that is transmitted through the optical device 1 and detected. Accordingly, the optical device 1 is able to easily obtain a desired signal intensity for light used in optical measurement, and to easily maintain measurement accuracy in optical measurement.

The optical device 1 is able to improve the rotational symmetry of each frame of the frame F relative to the cell C by including the first block 11 that includes the first frame F1 that has a rectangular shape, the second block 12 that includes the second frame F2 that has a hexagonal shape, and the third block 13 that includes the third frame F3 that has a rectangular shape. Accordingly, the optical device 1 is able to easily realize different optical systems by the rotational movement of the frame F by the rotation mechanism 20.

According to the second embodiment, the third block 13 is described as including optical elements in the same arrangement as that of the first block 11 illustrated in FIG. 2, but the third block 13 is not limited to this. The arrangement and type of optical elements that the third block 13 includes may be any able to vary the total length of the portion of the optical path P coincident with the measurement subject S. For example, the third block 13 need not include the lens 11c. In such a case, any lens that has a function of condensing collimated light may be disposed immediately outside the optical device 1.

According to the second embodiment, the third block 13 is described as including the third frame F3 that has a rectangular shape, but the third frame F3 is not limited to this. The third frame F1 may have any shape, including any other polygonal, circular, and elliptical shape, instead of a rectangular shape such as a rectangle or square.

According to the second embodiment, the rotation mechanism 20 is described, for example, as being attached to the second block 12 of the optical element block 10, and changing the angle of the second block 12 relative to the measurement subject S by rotating the second block 12, but the rotation mechanism 20 is not limited to this. The rotation mechanism 20 may be attached to at least one of the first block 11 and the third block 13 instead of or in addition to the second block 12.

Third Embodiment

Figure 6:
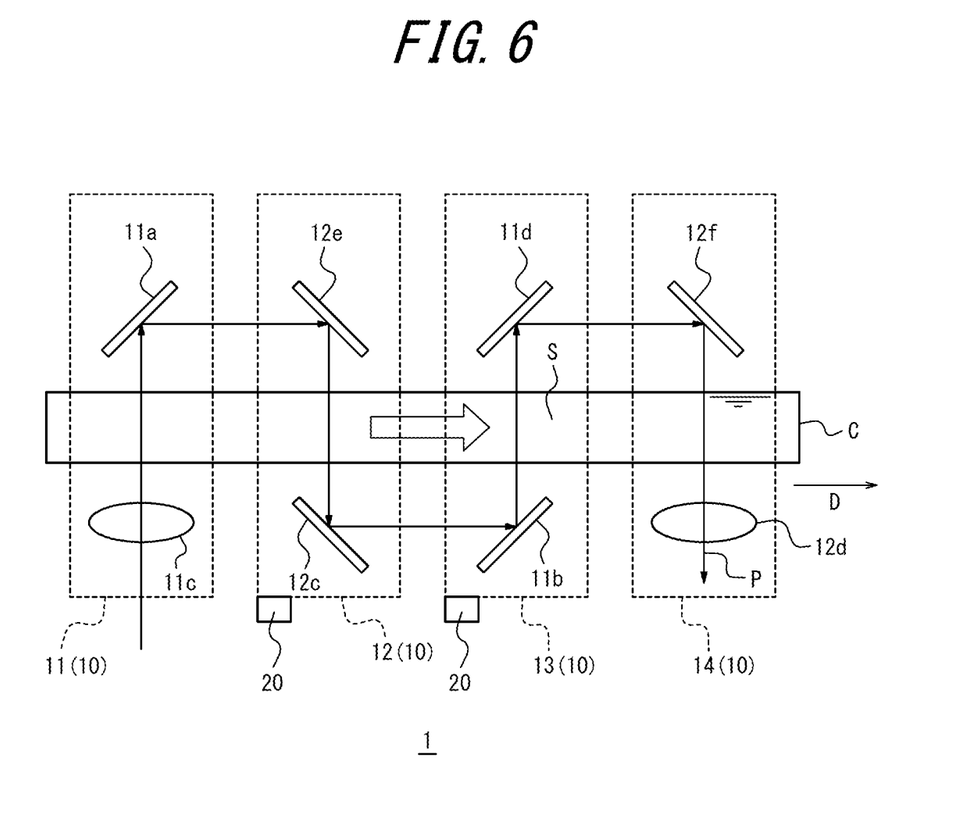
FIG. 6 is a schematic diagram corresponding to FIG. 1, illustrating a schematic configuration of the optical device according to a third embodiment of the present disclosure.

FIG. 6 is a schematic diagram corresponding to FIG. 1, illustrating a schematic configuration of the optical device 1 according to a third embodiment of the present disclosure. Configuration and functions of the optical device 1 according to the third embodiment are described with reference to FIG. 6. The optical device 1 according to the third embodiment differs from that of the first embodiment and the second embodiment in that the optical element block 10 further includes a fourth block 14.

Other configurations, functions, effects, variations, and the like are the same as in first embodiment and the second embodiment, and the corresponding descriptions also apply to the optical device 1 according to the third embodiment. In the following, the same symbols are used for the same components as in the first embodiment and the second embodiment, and descriptions thereof are not repeated. The main points that differ from the first embodiment and the second embodiment are explained below.

According to the third embodiment, the optical element block 10 further includes the fourth block 14. The fourth block 14 is exactly the same as the second block 12 illustrated in FIG. 3, but in FIG. 6 is disposed with respect to the cell C rotated 60° relative to the second block 12. According to the third embodiment, the frame F includes, in addition to the first block 11 that includes the first frame F1, the second block F2 that includes the second frame F2, and the third block 13 that includes the third frame F3, the fourth block 14 that includes a fourth frame F4. The fourth frame F4 is exactly the same as the second frame F2 and has a hexagonal shape.

As illustrated in FIG. 6, according to the third embodiment, the rotation mechanism 20 is attached to the second block 12 and the third block 13 of the optical element block 10, for example, and the angle of the optical element block 10 relative to the measurement subject S is changed by rotating at least one of the second block 12 and third block 13.

According to the example optical system illustrated in FIG. 6, the optical device 1 forms the optical path P while maintaining a defined angle for each of the first block 11, the second block 12, the third block 13, and the fourth block 14. For example, after being rotated by the rotation mechanism 20, the second block 12 maintains the angle illustrated in FIG. 6 as an example. For example, after being rotated by the rotation mechanism 20, the third block 13 maintains the angle illustrated in FIG. 6 as an example.

In the side view of FIG. 6, the fourth side F14 of the third block 13 is disposed above the cell C. The first side F11 of the third block 13 is disposed in front of the cell C. The second side F12 of the third block 13 is disposed below the cell C. The third side F13 of the third block 13 is disposed on the far side of the cell C.

The mirror 11b attached to the second side F12 of the third block 13 is disposed below the cell C, tilted to face the second block 12 and the cell C. The mirror 11d attached to the fourth side F14 of the third block 13 is disposed above the cell C, tilted to face the fourth block 14 and the cell C. In FIG. 6, the mirror 11a and the lens 11c are disposed in front of and on the far side of the cell C, respectively, but these optical elements, which do not directly contribute to the formation of the optical path P, are omitted from the drawing.

In the side view of FIG. 6, the sixth side F26 of the fourth block 14 is disposed above the cell C. The first side F21 of the fourth block 14 is disposed on the upper front side of the cell C. The second side F22 of the fourth block 14 is disposed on the lower front side of the cell C. The third side F23 of the fourth block 14 is disposed below the cell C. The fourth side F24 of the fourth block 14 is disposed on the lower far side of the cell C. The fifth side F25 of the fourth block 14 is disposed on the upper far side of the cell C.

The mirror 12f attached to the sixth side F26 of the fourth block 14 is disposed above the cell C. The mirror 12f is tilted to face the third block 13 and the cell C. The lens 12d attached to the third side F23 of the fourth block 14 is disposed below the cell C, facing the cell C. In FIG. 6, the combination of the mirror 12a and the lens 12b, the mirror 12c, and the mirror 12e are disposed on the upper front, lower front, and upper far sides of the cell C, respectively, but these optical elements, which do not directly contribute to the formation of the optical path P, are omitted from the drawing.

The optical device 1 causes light to be incident on the third side F13 of the first block 11, where the lens 11c as a collimating light means is attached. The lens 11c collimates light incident on the optical device 1 into collimated light and causes the collimated light to be incident on the measurement subject S. The optical device 1 causes the collimated light to be transmitted through the cell C housing the liquid to be measured as the measurement subject S.

The optical device 1 causes the collimated light transmitted through the cell C to be incident on the mirror 11a, which is attached to the first frame F1 to be tilted 45° to the left in the first block 11 relative to the extension direction D of the cell C. The mirror 11a reflects the collimated light transmitted through the measurement subject S toward the second block 12. The mirror 11a reflects the collimated light 90° and causes the collimated light to be incident on the second block 12.

The optical device 1 causes the collimated light reflected 90° by the mirror 11a to be incident on the mirror 12e, which is attached to the second frame F2 to be tilted 45° to the right in the second block 12 relative to the extension direction D of the cell C. The mirror 12e further reflects the collimated light toward the cell C to again be incident on the measurement subject S. The mirror 12e reflects the collimated light 90° and causes the collimated light to be incident on the measurement subject S.

The optical device 1 causes the collimated light transmitted through the cell C to be incident on the mirror 11c, which is attached to the second frame F2 to be tilted 45° to the left in the second block 12 relative to the extension direction D of the cell C. The mirror 12c further reflects the collimated light transmitted through the measurement subject S toward the third block 13. The mirror 12c reflects the collimated light 90° and causes the collimated light to be incident on the third block 13.

The optical device 1 causes the collimated light reflected 90° at the mirror 11c to be incident on the mirror 11b, which is attached to the third frame F3 to be tilted 45° to the left in the third block 13 relative to the extension direction D of the cell C. The mirror 11b further reflects the collimated light toward the cell C to again be incident on the measurement subject S. The mirror 11b reflects the collimated light 90° and causes the collimated light to be incident on the measurement subject S.

The optical device 1 causes the collimated light transmitted through the cell C to be incident on the mirror 11d, which is attached to the third frame F3 to be tilted 45° to the left in the third block 13 relative to the extension direction D of the cell C. The mirror 11d reflects the collimated light transmitted through the measurement subject S toward the fourth block 14. The mirror 11d reflects the collimated light 90° and causes the collimated light to be incident on the fourth block 14.

The optical device 1 causes the collimated light reflected 90° by the mirror 11d to be incident on the mirror 12f, which is attached to the fourth frame F4 to be tilted 45° to the right in the fourth block 14 relative to the extension direction D of the cell C. The mirror 12f further reflects the collimated light toward the cell C to again be incident on the measurement subject S. The mirror 12f reflects the collimated light 90° and causes the collimated light to be incident on the measurement subject S.

The lens 12d condenses the collimated light transmitted through the measurement subject S. The lens 12d condenses the collimated light and guides the light to a detector such as a photodetector or the like, or an optical transmission line such as an optical fiber or the like disposed outside the optical device 1.

The optical device 1 forms the optical path P so that light is transmitted four times through the cell C housing the liquid to be measured as the measurement subject S, or in other words, four times through the measurement subject S. The optical path P is normal to the cell C. That is, in all four of the transmissions, the collimated light is normally incident on one surface of the cell C and is emitted normally from another surface. The optical device 1 is also able to form the optical path P illustrated in FIGS. 1 and 4 using only the first block 11 and the second block 12 by adjusting the second block 12 to the angle illustrated in FIG. 1 and FIG. 4 by using the rotation mechanism 20. The optical device 1 is also able to form the optical path P illustrated in FIG. 5 using only the first block 11 through the third block 13 by adjusting the second block 12 and the third block 13 to the angles illustrated in FIG. 5 by using the rotation mechanism 20.

By further including the fourth block 14, the optical device 1 is able to greatly vary the optical path length of the portion of the optical path P coincident with the measurement subject S, as illustrated in FIG. 6, for example. For example, the optical device 1 is able to vary the optical path length described above by an integer multiple of the width of the cell C along the optical path P, according to normal incidence of light on the cell C and normal emission of light from the cell C. More specifically, the optical device 1 is able to vary the optical path length between one, two, three, and four times the length of the width of the cell C along the optical path P.

As described above, the optical device 1 is able to increase the number of times the collimated light is transmitted through the cell C in which the measurement subject S is housed by increasing the number of combinations of the first block 11 illustrated in FIG. 2 and the second block 12 illustrated in FIG. 3, for example.

Fourth Embodiment

Figure 7:
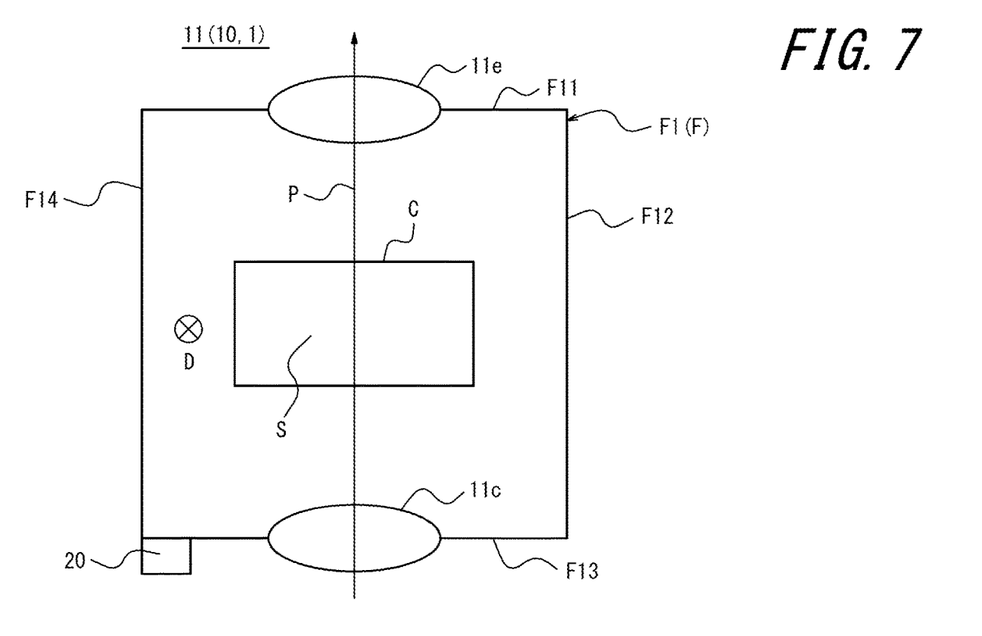
FIG. 7 is a schematic diagram corresponding to FIG. 2, illustrating an example of a schematic configuration of the optical device according to a fourth embodiment of the present disclosure.
Figure 8:
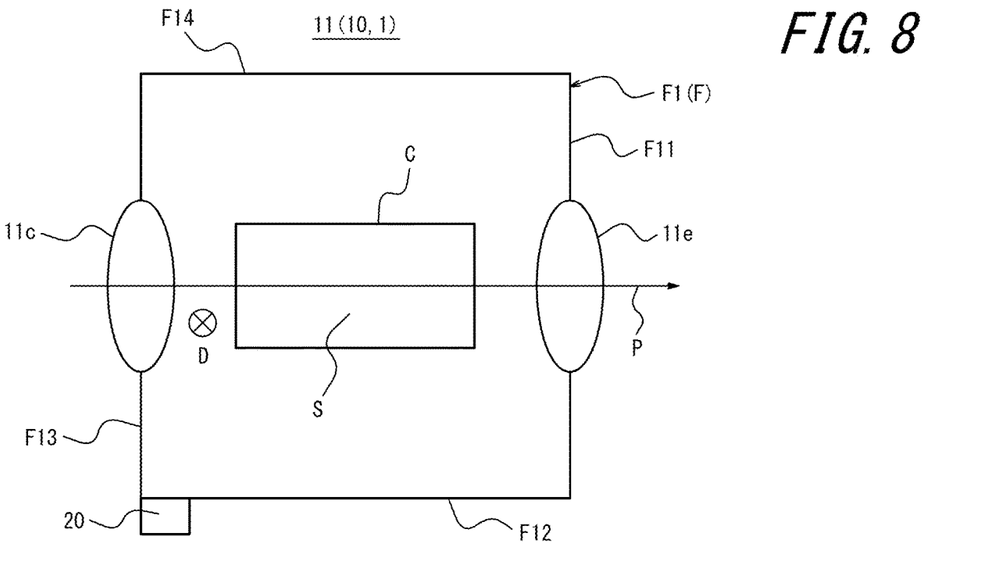
FIG. 8 is a schematic diagram corresponding to FIG. 2, illustrating another example of a schematic configuration of the optical device according to the fourth embodiment of the present disclosure.

FIG. 7 is a schematic diagram corresponding to FIG. 2, illustrating an example of a schematic configuration of the optical device 1 according to a fourth embodiment of the present disclosure. FIG. 8 is a schematic diagram corresponding to FIG. 2, illustrating another example of a schematic configuration of the optical device 1 according to the fourth embodiment of the present disclosure. Configuration and functions of the optical device 1 according to the fourth embodiment are described with reference to FIG. 7 and FIG. 8. The optical device 1 of the fourth embodiment differs from that of the first through third embodiments in that the optical element block 10 includes only the first block 11 and the first block 11 includes only a pair of lenses as optical elements.

Other configurations, functions, effects, variations, and the like are the same as in first through third embodiments, and the corresponding descriptions also apply to the optical device 1 according to the fourth embodiment. In the following, the same symbols are used for the same components as in the first through third embodiments, and descriptions thereof are not repeated. The main points that differ from the first through third embodiments are explained below.

The cell C that has a rectangular cross section when viewed from the extension direction D of the cell C is disposed centrally in the first block 11. The first block 11 includes a lens 11e attached to the first side F11. The first block 11 includes the lens 11c attached to the third side F13.

According to the first example of the optical system illustrated in FIG. 7, the lens 11e attached to the first side F11 of the first block 11 is disposed above the cell C, facing a long side of the cell C. The lens 11c attached to the third side F13 of the first block 11 is disposed below the cell C, facing a long side of the cell C. In this case, the optical path P is formed along a short length of the cell C.

The rotation mechanism 20 is attached to the first block 11. The second example of the optical system, illustrated in FIG. 8, is obtained by rotating the first block 11 by 90° using the rotation mechanism 20. The lens 11e attached to the first side F11 of the first block 11 is disposed to the right of the cell C, facing a short side of the cell C. The lens 11c attached to the third side F13 of the first block 11 is disposed to the left of the cell C, facing a short side of the cell C. In this case, the optical path P is formed along a long length of the cell C.

As described above, the optical device 1 is able to change the total length of the portion of the optical path P coincident with the measurement subject S according to the difference between the short and long sides of the cell C simply by rotating the first block 11 by 90° using the rotation mechanism 20.

According to the fourth embodiment, the rotation mechanism 20 is described as being attached to the first block 11 and rotating the first block 11, but the rotation mechanism 20 is not limited to this. The rotation mechanism 20 may be attached to the cell C instead of or in addition to the first block 11. By rotating the cell C by 90° using the rotation mechanism 20, the total length of the portion of the optical path P coincident with the measurement subject S may be changed according to the difference between the short and long sides of the cell C.

It is obvious to a person skilled in the art that the present disclosure may be realized in defined forms other than the embodiments described above, without departing from the spirit or essential features of the present disclosure. Accordingly, the preceding description is illustrative and not limiting. The scope of the present disclosure is defined by the appended claims, not by the preceding description. Any modifications that fall within the scope of equivalence are intended to be included in the scope of the present disclosure.

For example, the shape, size, arrangement, orientation, and number of each of the components described above are not limited to those illustrated in the above description and drawings. The shape, size, arrangement, orientation, and number of each of the components may be configured arbitrarily, as long as the function thereof is achievable. Each component of the optical device 1 illustrated in the drawings is a functional concept, and the specific form of each component is not limited to that illustrated in the drawings. For example, according to each of the embodiments described above, each mirror is illustrated as having a circular shape, but is not limited to this. Each mirror may have any other shape, including polygonal, elliptical, and the like. For example, according to each of the embodiments described above, each lens is illustrated as having an elliptical shape, but is not limited to this. Each lens may have any other shape, including polygonal, circular, and the like.

According to each of the embodiments described above, the optical device 1 may be configured so that an observation window is provided or an imaging device is attached to a defined side of the frame F to which no optical element is attached, so that the interior of the cell C is observable. Accordingly, the optical device 1 is able to perform both transmission measurement and image measurement simultaneously.

According to each of the embodiments described above, the optical device 1 may be configured to accurately reproduce a rotation angle by a positioning pin hole being provided in the optical element block 10 and fixing of the optical element block 10 with a positioning pin according to the rotation angle.

Some embodiments of the present disclosure are exemplified below. However, it should be noted that embodiments of the present disclosure are not limited to the examples below.

APPENDIX 1

An optical device comprising:
an optical element block including optical elements configured to form an optical path of light used for optical measurement, arranged around a measurement subject so that the optical path intersects the measurement subject; and
a rotation mechanism configured to change an angle of the optical element block relative to the measurement subject so that the total length of the portion of the optical path coincident with the measurement subject changes.

APPENDIX 2

The optical device according to appendix 1, wherein
the optical element block includes a frame to which the optical elements are attached, configured to surround the measurement subject, and the measurement subject is disposed centrally in the frame.

APPENDIX 3

The optical device according to appendix 2, wherein
the rotation mechanism is attached to the optical element block and is configured to change the angle of the optical element block relative to the measurement subject by rotating the optical element block.

APPENDIX 4

The optical device according to appendix 3, wherein
the optical element block includes a first block and a second block configured to be rotated by the rotation mechanism, wherein
the first block includes a first lens configured to cause collimated light to be incident on the measurement subject and a first mirror configured to reflect the collimated light transmitted through the measurement subject toward the second block.

APPENDIX 5

The optical device according to appendix 4, wherein
the second block includes a second mirror configured to further reflect the collimated light and a second lens configured to condense the collimated light that is reflected.

APPENDIX 6

The optical device according to appendix 4 or 5, wherein
the second block includes a third mirror configured to further reflect the collimated light to again be incident on the measurement subject, and a third lens configured to condense the collimated light transmitted through the measurement subject.

APPENDIX 7

The measurement apparatus according to any one of appendices 4 to 6, wherein
the optical element block further includes a third block, wherein
the second block includes a fourth mirror configured to further reflect the collimated light to again be incident on the measurement subject, and a fifth mirror configured to further reflect the collimated light transmitted through the measurement subject toward the third block, wherein
the third block includes a sixth mirror configured to further reflect the collimated light to again be incident on the measurement subject, and a fourth lens configured to condense the collimated light transmitted through the measurement subject.

APPENDIX 8

The optical device according to appendix 7, wherein
the frame includes a first frame, a second frame, and a third frame,
the first block includes the first frame that has a rectangular shape,
the second block includes the second frame that has a hexagonal shape, and
the third block includes the third frame that has a rectangular shape.

APPENDIX 9

The optical device according to any one of appendices 1 to 8, wherein
the measurement subject includes a liquid to be measured housed in a cell.

APPENDIX 10

The optical device according to appendix 9, wherein
a cross-section of the cell has a square shape when viewed from an extension direction of the cell.

The invention claimed is:

1. An optical device comprising:
an optical element block including an optical element configured to form an optical path of light used for optical measurement and a frame to which the optical element is attached, configured to surround a measurement subject so that the optical path intersects the measurement subject and dispose the measurement subject in the frame; and
a rotation mechanism configured to change an angle of the optical element block relative to the measurement subject so that an optical path length of a portion of the optical path coincident with the measurement subject changes, to vary the optical path length by an integer multiple of a width, along the optical path, of a cell in which the measurement subject flows or to vary the optical path length according to a difference between a short and long sides of the cell.

2. The optical device according to claim 1, wherein
the measurement subject is disposed centrally in the frame.

3. The optical device according to claim 2, wherein
the rotation mechanism is attached to the optical element block and is configured to change the angle of the optical element block relative to the measurement subject by rotating the optical element block.

4. The optical device according to claim 3, wherein
the optical element block includes a first block and a second block configured to be rotated by the rotation mechanism, wherein
the first block includes a first lens configured to cause collimated light to be incident on the measurement subject and a first mirror configured to reflect the collimated light transmitted through the measurement subject toward the second block.

5. The optical device according to claim 4, wherein
the second block includes a second mirror configured to further reflect the collimated light and a second lens configured to condense the collimated light that is reflected.

6. The optical device according to claim 4, wherein
the second block includes a third mirror configured to further reflect the collimated light to again be incident on the measurement subject, and a third lens configured to condense the collimated light transmitted through the measurement subject.

7. The optical device according to claim 4, wherein
the optical element block further includes a third block, wherein
the second block includes a fourth mirror configured to further reflect the collimated light to again be incident on the measurement subject, and a fifth mirror configured to further reflect the collimated light transmitted through the measurement subject toward the third block, wherein the third block includes a sixth mirror configured to further reflect the collimated light to again be incident on the measurement subject, and a fourth lens configured to condense the collimated light transmitted through the measurement subject.

8. The optical device according to claim 7, wherein
the frame includes a first frame, a second frame, and a third frame,
the first block includes the first frame that has a rectangular shape,
the second block includes the second frame that has a hexagonal shape, and
the third block includes the third frame that has a rectangular shape.

9. The optical device according to claim 1, wherein
the measurement subject includes a liquid to be measured housed in a cell.

10. The optical device according to claim 9, wherein
a cross-section of the cell has a square shape when viewed from an extension direction of the cell.

* * * * *